Figure 1:
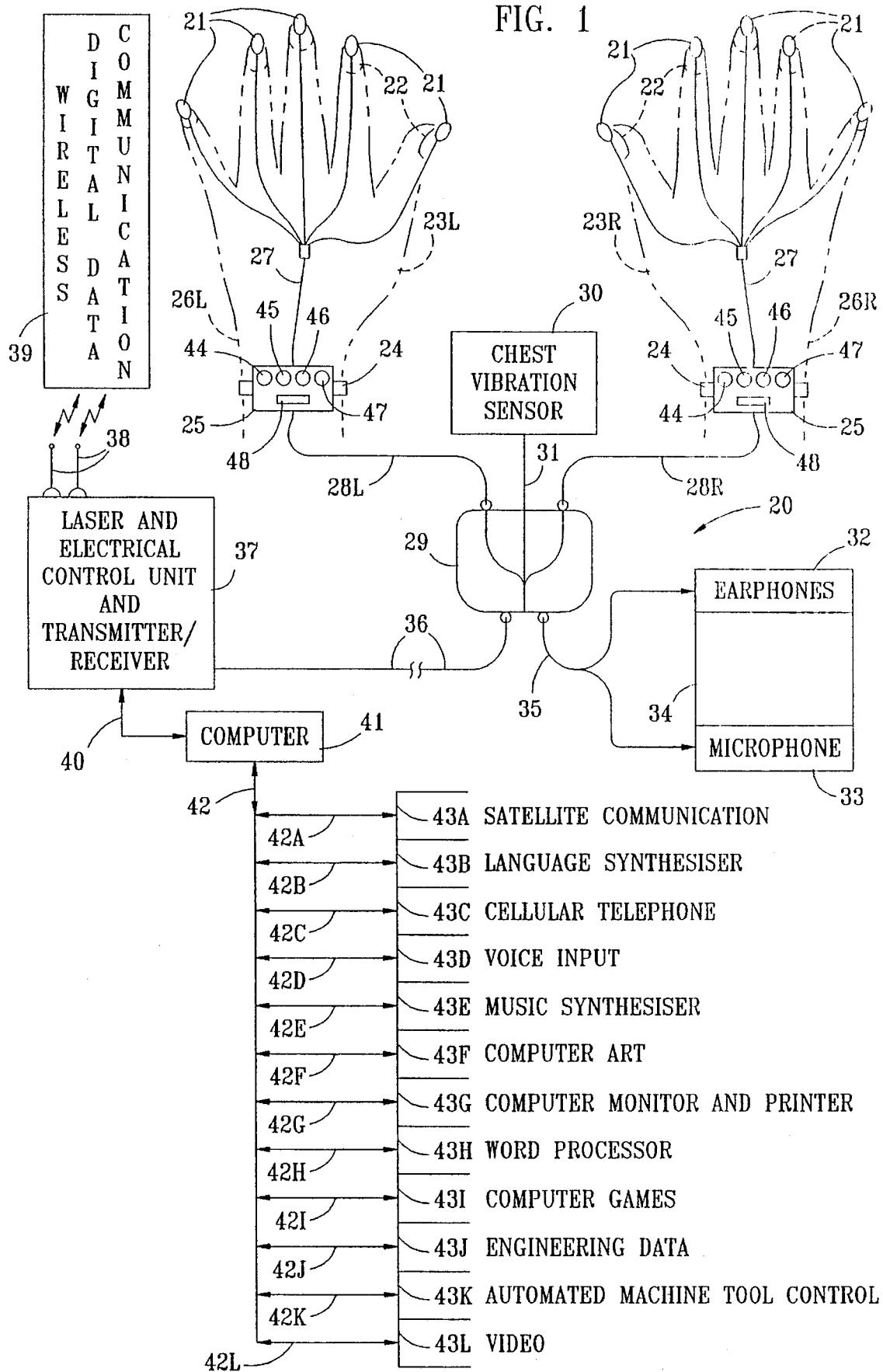

United States Patent [19]

Lee, Jr.

[11] Patent Number: 5,612,689

[45] Date of Patent: Mar. 18, 1997

[54] FINGER ARTICULATION CONTROLLED INFORMATION GENERATING SYSTEM

[76] Inventor: Edward A. Lee, Jr., 317 Rita Dr., Garland, Tex. 75042

[21] Appl. No.: 539,706

[22] Filed: Oct. 5, 1995

[51] Int. Cl.⁶ .................................................. H03K 17/94
[52] U.S. Cl. ........................... 341/20; 341/173; 341/191; 364/709.11; 315/3
[58] Field of Search ................................ 341/20, 21, 22, 341/26, 173, 186, 191; 364/190, 709.01, 709.11; 340/825.19; 313/364.459, 418, 419, 146, 149; 315/3, 76, 133; 273/148 B

[56] References Cited

U.S. PATENT DOCUMENTS

| | | | |
|---|---|---|---|
| 3,022,878 | 2/1962 | Seibel et al. | 341/20 |
| 4,414,537 | 11/1983 | Grimes | 341/20 |
| 4,905,001 | 2/1990 | Penner | 341/20 |
| 5,047,952 | 9/1991 | Kramer et al. | 341/20 |
| 5,097,252 | 3/1992 | Harvill et al. | 341/20 |
| 5,151,553 | 9/1992 | Suzuki et al. | 341/20 |
| 5,488,362 | 1/1996 | Ullman et al. | 341/20 |

*Primary Examiner*—Jeffery Hofsass
*Assistant Examiner*—Andrew Hill
*Attorney, Agent, or Firm*—Warren H. Kintzinger

[57] ABSTRACT

A plurality of finger articulation units that individually mount on finger and thumb nails and together, by selected up and down movement of the fingers and thumbs (ten fingers), serve as an alternate to a keyboard and/or for any human to machine and/or computer interface. Vertical up and down movements of any single one of the ten fingers and various combinations of the fingers is translated into a range of signals recognizable as alpha-numeric numbers, digital signalling, word and picture forms or other symbol forms a user may choose. The individual finger articulation devices are each attached to the ten fingernails by clips securing a unit to each of the ten fingernails whereby movement of a particular finger, up and down is detected. The device on that finger generates a signal passed via interface control to a computer for interpretation by a program to produce a symbol. One hand can send ten signals and two hands twenty signals that can be combined in almost an infinite combination of signals via customized computer programs.

7 Claims, 4 Drawing Sheets

FINGER ARTICULATION CONTROLLED INFORMATION GENERATING SYSTEM

BACKGROUND OF THE INVENTION

This invention relates in general to data control systems, and more particularly, to a finger articulation controlled information generating system.

Use of the new system is a replacement for a keyboard not requiring a user to sit in a fixed position before a keyboard. A user of the system can input data from the system either standing, walking, driving or lying down. Many preceding human data input approaches have required complex dedicated use of one's hands in addition to being bodily in a fixed location and position. While applicant's approach uses individual signal originating devices worn on individual fingernails, lands and fingers are free to grasp generally without interference. The computer program used translates the electrical signals generated by the finger tip movements to data symbols desired in response to singular finger movements and simultaneous combinations of finger movements, two to ten fingers at once with those less than ten in various combinations.

It is, therefore, a principal object of this invention to provide a data control system freeing a user from a keyboard.

Another object is to provide such a data control system that permits a user to move around rather than being restricted to a specific operational location.

A further object with such a data control system is improved operational versatility.

still another object with such a data control system is to provide a system with selectable outputs one or more in various combinations for different applied uses.

Features of the invention useful in accomplishing the above objects include, in a finger articulation controlled information system, a plurality of finger articulation units that individually mount on finger and thumb nails and together by selected up and down movement or movement in any direction within 360° of the fingers and thumbs (ten fingers) serve as an alternate to a keyboard and/or for any human to machine and/or computer interface. Vertical up and down movements of any single one of the ten fingers and various combinations of the fingers is translated into a range of signals recognizable as alpha-numeric numbers, digital signalling, word and picture forms or other symbol forms a user may choose. The individual finger articulation devices are each attached to the ten fingernails by clips securing a unit to each of the ten fingernails whereby movement of a particular finger up or down or otherwise in 360° is detected. The device on that finger generates a signal passed via interface control to a computer for interpretation by a program to produce a symbol. One hand can send ten signals and two hands twenty signals as related to up and down finger movement and more as related to finger movement within 360° of movement that can be combined in almost an infinite combination of signals via customized computer programs. The data control system is useable in combination with voice confirmation, and with a wireless network the user is not dependent on a display to verify input information. Verification can be by voice as data is input to the receiving end of the system allowing freedom of data input while walking or driving or any other activity where viewing a display terminal is not feasible. Signals can then be transmitted to one or many designated receivers within a local area or a multitude of receivers by way of wire fiber optics or satellite.

In one embodiment of the finger nail mounted devices a weighted electron emitter cathode needle is mounted for deflective movement within a glass vacuum tube that is protectively mounted within a plastic housing. The needle is resiliently urged toward an off position. An electron detector array is embedded in glass at the forward end of the tube via which signals are induced by a focused election beam from the electron emitter cathode needle being passed thereover. Electron collector anode terminals within the tube are connected back through the rear tube end to the exterior. An intentional finger down movement causes an upward inertia induced flexed delay of the electron emitter cathode needle so the electron beam impinges on an upper electron collector anode contact and an upper movement a downward inertia induced flexed delay of the electron emitter cathode needle so the electron beam impinges on a lower electron collector anode contact generating electrical signals.

Specific embodiments representing what are presently regarded as the best modes of carrying out the invention are illustrated in the accompanying drawings.

Figure 2:
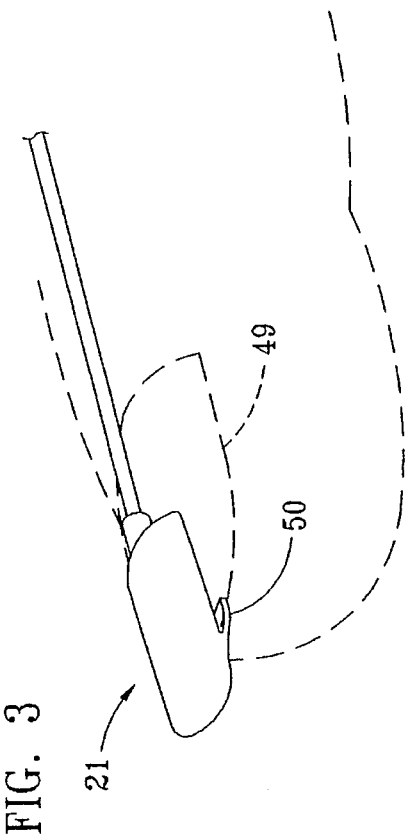
Figure 3:
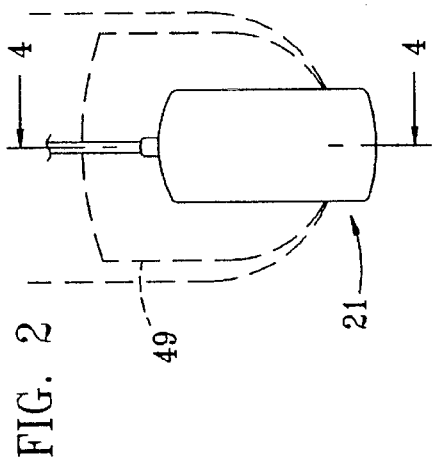
Figure 4:
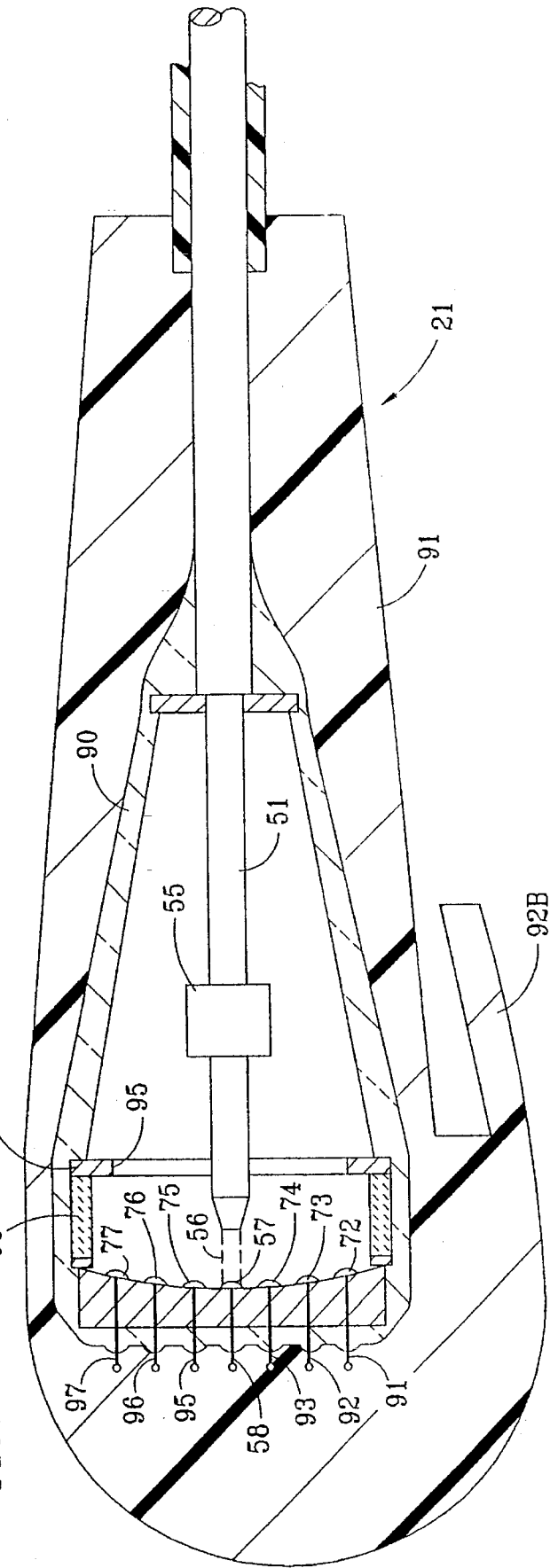
Figure 5:
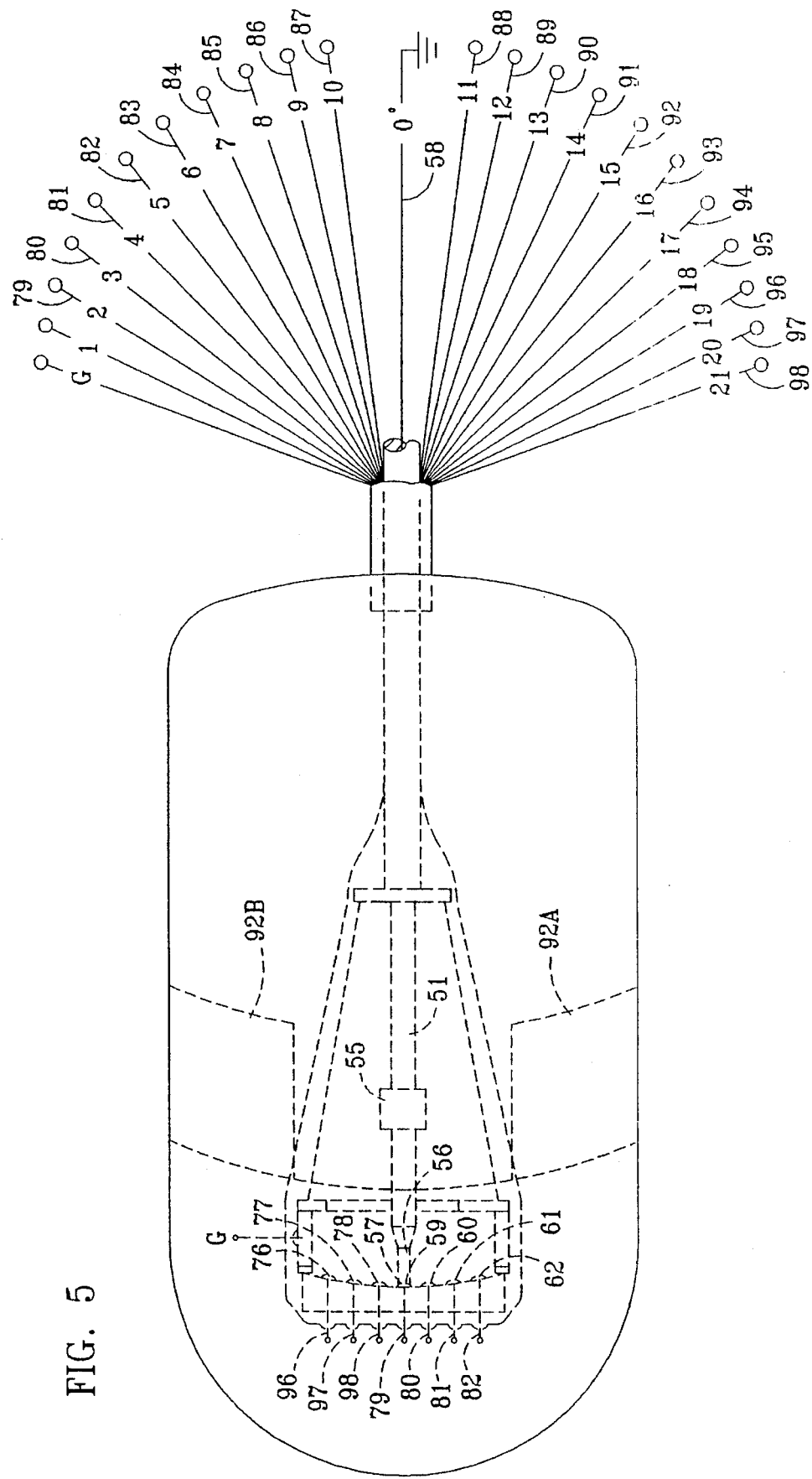
Figure 6:
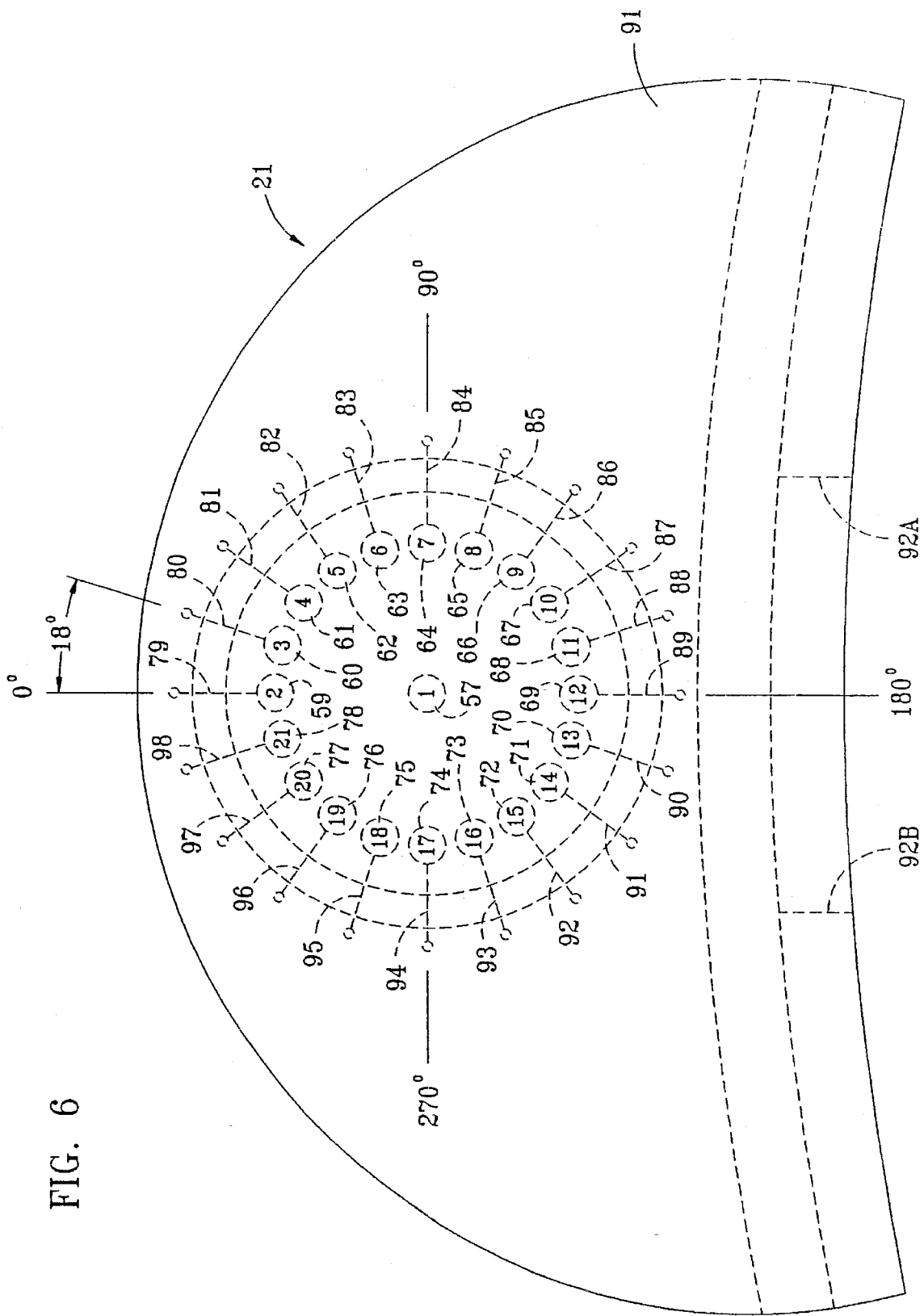

In the drawings:

FIG. 1 represents a block schematic of the finger articulation controlled information generating system;

FIG. 2, a top plan view of a finger articulation unit as mounted on a finger;

FIG. 3, a perspective view of the finger articulation unit as mounted on a finger;

FIG. 4, a broken away and sectioned side elevation view taken along line 4—4 of FIG. 2 showing internal detail of a finger unit;

FIG. 5, a top planar enlarged view of a finger unit showing internal detail; and, FIG. 6, a front elevation view of the finger unit of FIGS. 2–5.

Referring to the drawings:

The finger articulation controlled information generating system 20 of FIG. 1 is shown to include finger and thumb mounted articulation units 21 mounted on the fingernails 22 of both a person's left land 23L and right hand 23R. A wrist strap 24 control unit 25 mounted on each wrist 26L and 26R is connected by wire bundles 27 to each articulation unit 21 and by wire bundles 28L and 28R to a chest wired signal distribution and input circuit 29. Signal distribution circuit 29 is connected to a chest vibration sensor 30 through line 31, to an earphone 32 and microphone 33 headset 34 through line bundle 35 and through line bundle 36 to laser telecommunication control transmitter/receiver 37. The transmitter/receiver 37 has transceiver antennae 38 in communication to and from wireless digital data telecommunication unit 39 and is connected through wire bundle 40 for back and forth signalling to and from computer 41. Computer 41 output and signal return wire bundle 42 has two way signal branches 42A–L to satellite communication, language synthesizer, cellular telephone, voice input, music synthesizers, computer art, computer monitor and printer, word processor, computer games, engineering data, automated machine tool control and video units 43A–L, any one or more of which could be in use at any one particular time. Referring again to the control units 25 each has a digital touch select switch 44, a down select on/off switch 45, and up select on/off switch 46, a sensitivity select switch 47 and a power on/off switch 48.

As shown in FIGS. 2–6 the finger and thumb articulation units 21 are mountable on finger nails 49 by a clip 50 of the units 21 that extends under the leading end of respective finger nails 49. Units 21 are shown in FIG. 4 to have a weighted electron emitter cathode needle 51 with pivotal flexing relative to the rear end for pivotal movement of the needle 51 up and down and through 360° within a glass vacuum tube 53 in turn mounted within an outer molded plastic housing 54. The electron beam emitter cathode needle 51 includes a weight 55 in order to enhance flexing of the needle opposite to finger tip movement through 360° of potential movement. This enables the electron beam 56 emanating from needle 51 to move from impingement on the center anode 57 connected to a voltage potential reference source (ground) through line 58. With reference to FIGS. 4–6 radially displaced anodes 59–78 are connected respectively, through lines 70–98 to utilizing circuitry.

Each fingernail 49 mounted finger articulation device 21 is an electron beam 56 device contained within a vacuum glass enclosure tube 90 mounted within a molded plastic housing 91 having a fingernail bifurcated two section mounting clips 92A and 92B on its bottom. Electron beam emitter cathode needle 51 is mounted at its rear within tube 90 and housing 91 and within the tube enclosure space mounts a weight 55 toward its forward electron beam 56 emitting end for enhanced flexing of the needle 51 with finger tip movement as desired. Each tube 90 has an electron grid 93, within the forward end of the tube adjacent the electron collector anode forward end of the tube 90, and an annular ring 94 has a cathode needle deflection limiting aperture 95. Each devise 21, referring to FIG. 6, is shown to have twenty electron collector anodes in a circle and one in the center. The center electron collector anode 57 is at ground (or are a preset voltage potential reference level). When a finger tip is moved the stream of electrons from the emitter leaves the center anode 57 and comes into contact with an anode, or possibly two or more at once, of the twenty anodes 59–78 around the anode circumference. Use via computer enhancement will control determine what collector point the computer will read with personal programs arbitrary with modification at the user's discretion. The electron beam and the electron emitter 51 are normally at rest on center and resiliently moveable from this state by movement of the finger tip. All of the anodes other than the center anode are equal distance from the center with this distance so small (approximately 0.027 inches) that it allows the slightest movement to have an effect with the diameter of the electron beam controlled by the grid and emitter voltages. The higher the emitter voltage the more stable the emitter electron beam. With lower grid voltage the electron beam diameter is increased with increased likelihood of more than one anode being activated. This can be interpreted by computer as a vertical up or down or angled movement as determined by user fingertip movement. Acceleration in transverse movement of the electron beam is a function of and determined by the time it takes the beam to move from the center anode directional orientation to any of the outer anodes.

Whereas this invention is illustrated and described with respect to a preferred embodiment thereof, it should be realized that various changes may be made without departing from the essential contribution to the art made by the teachings hereof.

I claim:

1. A finger articulation unit individually mountable on finger and thumb nails useable in groups up to ten on a person's finger nails useful for machine control and computer input control comprising: a finger articulation unit with movement, as related to the orientation mounting of each unit, of any single one of the ten fingers and various combinations of the fingers being translatable into a range of signals recognizable as alpha-numeric numbers, digital signalling, word and picture forms with one hand capable of at least ten signals and two hands at least twenty signals combinable in almost an infinite combination of signals via customized computer programs; said finger articulation unit including enclosure means with an inner glass vacuum tube mounted within an outer plastic housing; finger nail mounting clip means on said outer plastic housing; weighted elongate electron emitter cathode flexible needle arm means mounted within the rear end of said glass vacuum tube and extended longitudinally within said tube to an end adjacent to the forward end of said glass vacuum tube with flexing movement of said weighted elongate arm means in a plane generally perpendicular to the cross axis of said finger nail mounting clip means; and arm sensing means at the forward portion of said finger articulation unit.

2. The finger articulation unit of claim 1, wherein said arm means is in the form of a weighted electron emitter cathode flexible needle with the mounting at a first end of the needle and weight means on said needle toward a second end of said needle remote from said first end mounting; and said motion sensing means includes a electron beam impinging oil anodes of an annular multiple anode detector array oriented in the plane of flexible movement of said needle.

3. The finger articulation unit of claim 2, wherein said annular multiple anode detector array is embedded in glass at the forward end of said glass vacuum tube.

4. The finger articulation unit of claim 3, wherein the electron beam is emanating from the forward end of said needle.

5. The finger articulation unit of claim 4, wherein an electron grid is mounted on the inside front of said glass vacuum tube aids in narrowing the electron beam from the needle weighted end.

6. The finger articulation unit of claim 5, wherein said needle weighted end includes electrical conductive material.

7. A finger articulation signal inducing unit comprising: enclosure means with an inner glass vacuum tube mounted within an outer plastic housing; finger nail mounting clip means on said outer plastic housing; weighted elongate flexible arm means mounted within the rear end of said glass vacuum tube and extended longitudinally within said tube to an end adjacent to the front end of said glass vacuum tube with flexed movement of said weighted elongate arm means in a plane generally perpendicular to the cross axis of said finger nail mounting clip means; and fingertip induced arm motion sensing means at the forward portion of said finger articulation unit.

\* \* \* \* \*